United States Patent
Spaulding et al.

(10) Patent No.: US 10,401,246 B2
(45) Date of Patent: Sep. 3, 2019

(54) POWDER FEED CONTROL SYSTEM AND METHOD

(71) Applicant: OERLIKON METCO (US) INC., Westbury, NY (US)

(72) Inventors: Mark Frank Spaulding, Northport, NY (US); Daniel R. Arjona, Elmont, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 0 days.

(21) Appl. No.: 15/609,991

(22) Filed: May 31, 2017

(65) Prior Publication Data

US 2018/0346261 A1    Dec. 6, 2018

(51) Int. Cl.
| B65G 53/66 | (2006.01) |
| G01L 13/02 | (2006.01) |
| G05D 11/13 | (2006.01) |

(52) U.S. Cl.
CPC .......... G01L 13/02 (2013.01); G05D 11/131 (2013.01)

(58) Field of Classification Search
CPC ......... B65G 53/12; B65G 53/14; B65G 53/66
USPC ..................... 406/14, 30, 144, 146
See application file for complete search history.

(56) References Cited

U.S. PATENT DOCUMENTS

| 2,771,323 A | * | 11/1956 | Taylor | ...................... B01J 8/082 |
| | | | | 406/14 |
| 3,291,536 A | * | 12/1966 | Smoot | ............... B65G 53/4633 |
| | | | | 406/14 |
| 3,501,097 A | | 3/1970 | Daley | |
| 4,017,269 A | * | 4/1977 | Dutz | ......................... C10J 3/30 |
| | | | | 110/101 C |
| 4,284,032 A | * | 8/1981 | Moos | .................... B05B 7/1404 |
| | | | | 118/308 |
| 4,381,898 A | * | 5/1983 | Rotolico | .................. B01J 8/001 |
| | | | | 406/118 |
| 4,502,819 A | * | 3/1985 | Fujii | ..................... B65G 53/66 |
| | | | | 406/132 |
| 4,561,808 A | | 12/1985 | Spaulding | |
| 4,669,921 A | | 6/1987 | Flament | |
| 4,679,704 A | * | 7/1987 | Dunlop | ................. B65G 53/66 |
| | | | | 193/34 |
| 4,730,499 A | | 3/1988 | Gianella | |

(Continued)

OTHER PUBLICATIONS http://www.nxp.com/assets/documents/data/en/data-sheets/MPX5100.pdf.
PCT Search Report dated Sep. 25, 2018 issued in PCT/US18/32704.

*Primary Examiner* — Joseph A Dillon, Jr.
(74) *Attorney, Agent, or Firm* — Greenblum & Bernstein, P.L.C.

(57) ABSTRACT

Powder feed rate control system that includes a hopper adapted to contain a powder and to maintain a hopper pressure. A carrier conduit delivers a carrier gas flow and having an orifice. The carrier gas flow conveys powder entering through the orifice at a powder feed rate. A differential pressure transducer includes a first pressure input associated with the hopper pressure and a second pressure input associated with the carrier gas flow downstream of the hopper. The differential pressure transducer (PT) outputs a signal related to a differential pressure between the first pressure input and the second pressure input. An electro pneumatic regulator (EP) is adapted to communicate with a control and receiving the signal related to the differential pressure.

14 Claims, 4 Drawing Sheets

(56) References Cited

U.S. PATENT DOCUMENTS

| | | | | |
|---|---|---|---|---|
| 4,784,533 | A | * | 11/1988 | Teigen .................... B01J 8/003 |
| | | | | 110/245 |
| 4,852,773 | A | | 8/1989 | Standlick |
| 4,863,316 | A | | 9/1989 | Gianella |
| 4,900,199 | A | | 2/1990 | Spaulding |
| 5,018,910 | A | * | 5/1991 | Weiss ........................ B05B 5/12 |
| | | | | 406/108 |
| 5,071,289 | A | * | 12/1991 | Spivak .................. B65D 88/70 |
| | | | | 406/11 |
| 5,332,337 | A | * | 7/1994 | Wilde .................... B65G 53/14 |
| | | | | 406/146 |
| 5,494,381 | A | * | 2/1996 | Heyl ...................... B65G 53/12 |
| | | | | 406/14 |
| 5,615,832 | A | * | 4/1997 | Price .................... B05B 7/1404 |
| | | | | 137/489.5 |
| 5,796,007 | A | | 8/1998 | Panagotopulos |
| 6,287,056 | B1 | * | 9/2001 | Szikszay ................ B65G 53/12 |
| | | | | 406/127 |
| 6,598,803 | B1 | | 7/2003 | Haas |
| 8,337,122 | B2 | * | 12/2012 | Schultz .................. B65G 53/66 |
| | | | | 406/137 |
| 9,586,306 | B2 | | 3/2017 | Zhang |
| 2005/0199135 | A1 | | 9/2005 | Nishinomiya |
| 2006/0056924 | A1 | * | 3/2006 | Jurkovich .............. B65G 53/66 |
| | | | | 406/39 |
| 2007/0007109 | A1 | | 1/2007 | Powell |
| 2012/0237302 | A1 | * | 9/2012 | Ashie-Winns .......... G01L 13/02 |
| | | | | 406/34 |

\* cited by examiner

POWDER FEED CONTROL SYSTEM AND METHOD

BACKGROUND OF THE INVENTION

1. Field of the Invention

The invention relates to a powder feed rate control system and method which utilizes, among other things, a differential pressure transducer (PT or DPT) and an electro pneumatic regulator (EP or EPR) adapted to communicate with a control and receiving a signal related to the differential pressure.

2. Discussion of Background Information

Powder feed rate control system are known. For example, U.S. Pat. No. 4,900,199 to SPAULDING, U.S. Pat. No. 4,561,808 to SPAULDING, U.S. Pat. No. 4,669,921 to FLAMENT, and U.S. Pat. No. 4,863,316 to GIANELLA, the disclosures of which are herein incorporated by reference in their entireties, describe such systems as utilizing a hopper that is subjected to a hopper pressure as well as a carrier conduit with one or more inlet orifices that conveys the powder at a powder flow rate, via a hose, to a spray device operating at a process pressure.

The system of U.S. Pat. No. 4,900,199, for example, utilizes a device (see R2 in FIG. 1 of U.S. Pat. No. '199) that functions as a differential pressure regulator (DPR) or a computing relay regulator (CRR).

Figure 1:
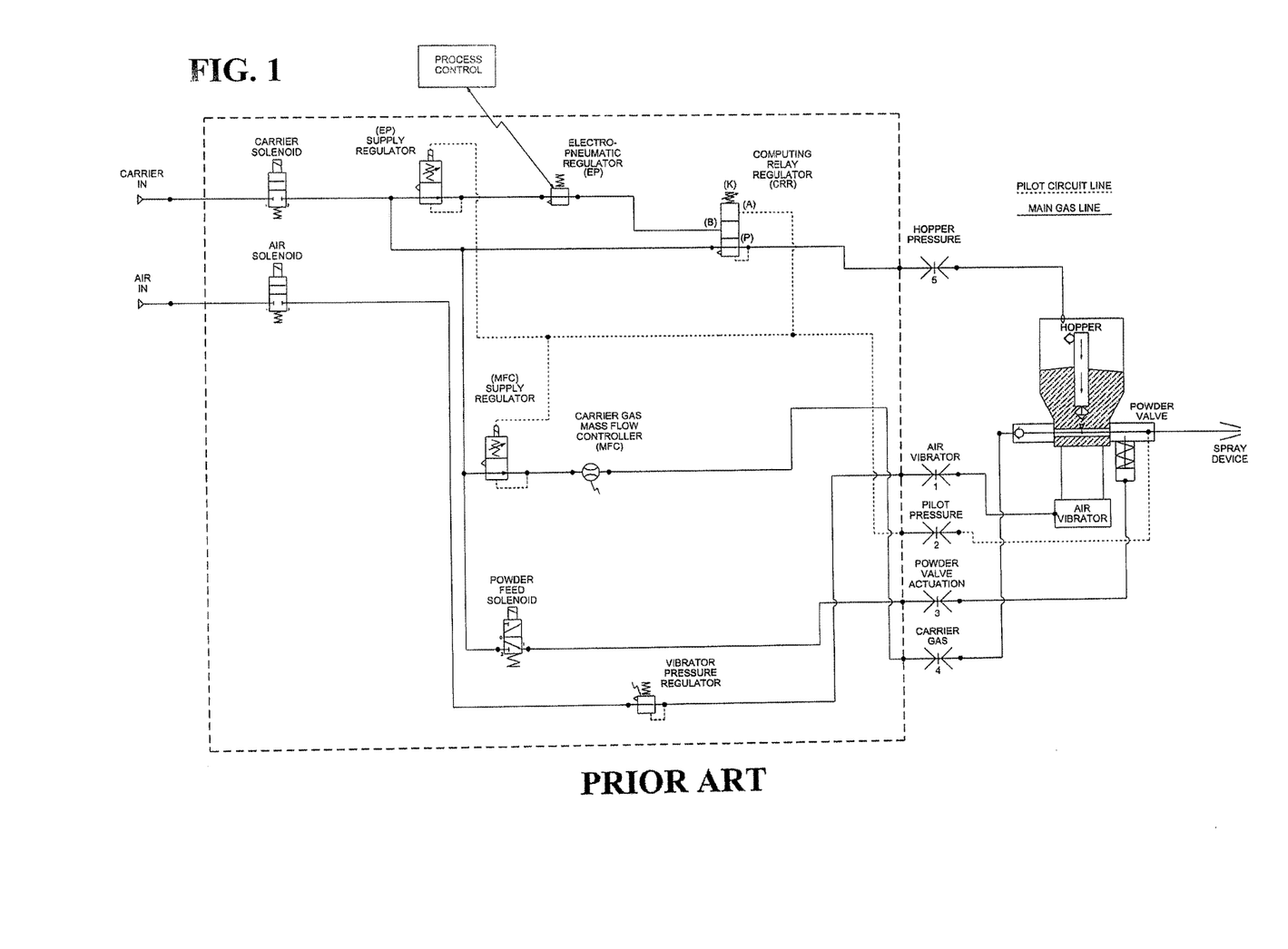
FIG. 1 is a schematic showing a pneumatic circuit of a powder feed control system in accordance with the prior art.

Current systems, such as is shown in FIG. 1, use a CRR to control and maintain pressure drop across the orifice of the carrier conduit. As the CRR functions as a differential pressure regulator, it is labeled as such in FIG. 1. However, the CRR is a mechanical or manual regulating device that uses a knob to set a pressure and outputs a hopper pressure P to the hopper. The CRR receives supply pressure of typically 10 bar. The pressure P (right-side lower sold line from CRR) output from the CRR to the hopper (hopper pressure) is based in adding the pressure A (an input to the CRR from the hopper) associated with the output side of the carrier conduit (i.e., the carrier hose pressure or process pressure used by the spray device) and a pressure B which is a direct input to the CRR from an EP regulator (shows as a line to the left-side middle of the CRR in FIG. 1). The CRR also has a manual adjustment screw that allows the CRR to be tuned, set or calibrated to zero (which typically occurs at its manufacturing facility). The value of this factory setting is K. Thus, the hopper pressure P is determined by the formula P=A+B+/−K. With such systems, the process pressure is typically between 0 and 8 bar and the hopper pressure is typically 0 to 1 bar over the process pressure. Details of an exemplary current 9MP powder feeder system can be found at https://www.oerlikon.com/metco/en/products-services/coating-equipment/thermal-spray/feeders/feeders-hvof/hvof-9mp/, the disclosure of which is hereby expressly incorporated by reference in its entirety.

In current system operation, a control sends command voltage to an EP regulator which outputs a pressure B to the CRR. The CRR receives pressure B as an input and outputs pressure P based on the above-noted formula.

SUMMARY OF THE INVENTION

Embodiments of the invention offer a simplified control scheme that, among other things, eliminates the CRR and thus utilizes fewer components, has greater sensitivity, is more accurate, less prone to need recalibration.

Embodiments of the invention also improve the ability to control the powder feed rate so that the proper amount of powder is delivered to the spraying devices such as a powder spray gun.

Embodiments of the invention also replace a less reliable mechanical system utilizing a mechanical computing relay regulator (CRR) located between an EP regulator and the powder feeder with a more reliable and less mechanical system utilizing an EP regulator in conjunction with a differential pressure transducer (PT or DPT) to control the powder feed rate.

Embodiments of the invention use an external DP Transducer which is directly coupled to an EP Regulator (and its Proportional Integral Derivative (PID) loop) wherein the components, i.e., DP Transducer and EP Regulator, precisely maintain process differential pressure regardless of process back pressure. This is more advantageous that using a CRR or DPR, which mechanically adds gas pressure signals together. Advantages include improved product performance and cost reduction.

Embodiments of the invention also include the ability to maintain a differential pressure in real-time regardless of process pressure changes and without any input from the control system.

In embodiments, the invention is a powder feed rate control system comprising a hopper adapted to contain a powder and to maintain a hopper pressure. A carrier conduit delivers a carrier gas flow and having an orifice, said carrier gas flow conveying powder entering through the orifice at a powder feed rate. A differential pressure transducer comprises a first or high/higher pressure input associated with the hopper pressure and a second or low/lower pressure input associated with the carrier gas flow downstream of the hopper. The differential pressure transducer (DPT) outputs a signal related to a differential pressure between the first pressure input and the second pressure input. An electro pneumatic regulator is adapted to communicate with a control and receiving the signal related to the differential pressure.

In embodiments, the control regulates the carrier gas flow.

In embodiments, the control determines or sets the carrier gas flow.

In embodiments, the differential pressure is between 0 and 1 bar.

In embodiments, the electro pneumatic regulator receives a supply pressure of between 2 bar and 10 bar.

In embodiments, the system further comprises a spray device coupled to the carrier conduit and operating at a process pressure.

In embodiments, the process pressure is between 0 bar and 8 bar.

In embodiments, the spray device is coupled to the carrier conduit via a powder feed hose.

In embodiments, the signal comprises signal voltage.

In embodiments, the electro pneumatic regulator receives command signals from the control.

In embodiments, the control receives signals from the electro pneumatic regulator.

In embodiments, the differential pressure is between 0 and 1 bar.

In embodiments, the system is configured to maintain a differential pressure in real-time regardless of process pressure changes and without any input from the control.

In embodiments, the invention is a powder feed rate control system comprising a control, a hopper adapted to contain a powder and to maintain a hopper pressure, a carrier conduit delivering a carrier gas flow and having an orifice, said carrier gas flow conveying powder entering through the orifice at a powder feed rate, a differential pressure transducer comprising a first pressure input coupled to a hopper pressure line and a second pressure input coupled to a process pressure line. The differential pressure transducer outputs a signal related to a differential pressure between a hopper pressure and a process pressure. An electro pneumatic regulator receives command voltage signals from the control and receives the signal related to the differential pressure. The differential pressure is proportional to the powder feed rate and is maintained at a pressure of between 0 and 1 bar.

In embodiments, the invention is a method of regulating powder feed rate, the method comprising subjecting a hopper containing powder to a hopper pressure, delivering a carrier gas flow via a carrier conduit having an orifice, said carrier gas flow conveying powder entering through the orifice at a powder feed rate, supplying powder to a spray device at a process pressure, measuring a differential pressure, via a differential pressure transducer, between the hopper pressure and the process pressure and outputting, to an electro pneumatic regulator, a signal related to the differential pressure.

In embodiments, the electro pneumatic regulator communicates with a control and receives the signal related to the differential pressure.

In embodiments, the method further comprises regulating the carrier gas flow with the control, wherein the carrier gas flow is between 2 and 15 l/m (liters/minute).

In embodiments, the electro pneumatic regulator receives a supply pressure of between 2 bar and 10 bar.

In embodiments, the spray device is at least one of subject to a process pressure of between 0 bar and 8 bar and coupled to the carrier conduit via a powder feed hose.

In embodiments, the signal comprises signal voltage and the differential pressure is between 0 and 1 bar.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a spray device" would not preclude the use of plural or multiple spray devices unless specifically excluded. For example, as used herein, the indefinite article "a" indicates one as well as more than one and does not necessarily limit its referent noun to the singular.

Except where otherwise indicated, all numbers expressing quantities used in the specification and claims are to be understood as being modified in all instances by the term "about." For example, a range of 1 to 5 is intended to encompass or be equivalent to a range of about 1 to about 5. Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

Terms such as "substantially parallel" can refer to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of", so that for instance "a composition comprising a compound A" may also (essentially) consist of the compound A.

The various embodiments disclosed herein can be used separately and in various combinations unless specifically stated to the contrary.

Figure 2:
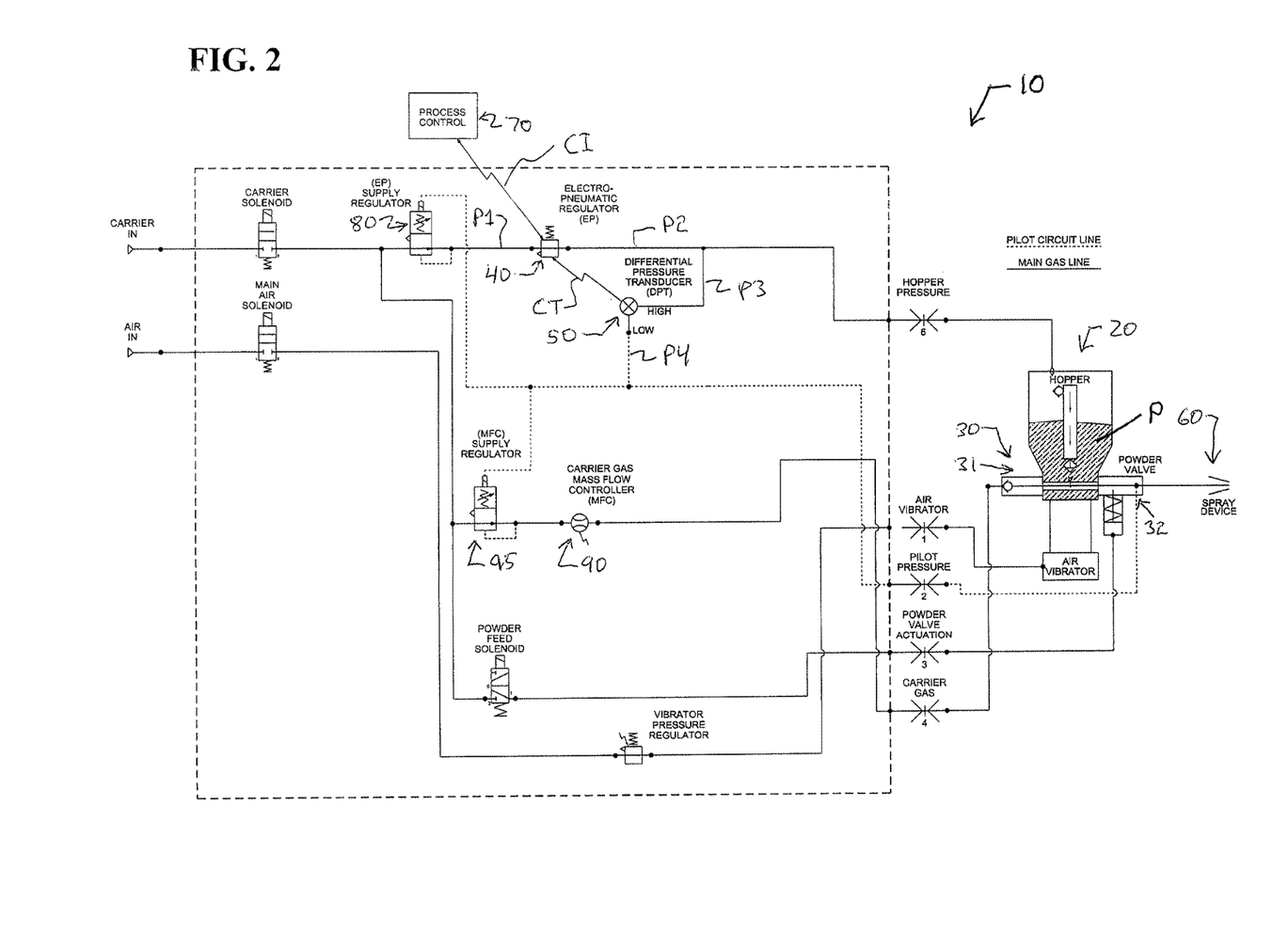
FIG. 2 is a schematic showing a pneumatic circuit of a powder feed control system in accordance with the invention.

With reference to FIG. 2, it can be seen how the powder feed control system 10 of the invention eliminates the CRR of FIG. 1 and instead utilizes an electro pneumatic (EP) regulator 40 and a differential pressure transducer (DPT or PT) 50. The DPT 50 is thus directly coupled to the EP 40. The EP 40 is an electrically controlled pressure regulator. The DPT 50 outputs an electrical signal in proportion to the difference in gas pressure between 2 input ports P3 and P4. This system allows for better regulation of the powder feed rate by maintaining a differential pressure in real-time regardless of process pressure changes and without any input from a control. This provides precise differential pressure control across the powder feeder metering device which is essential for optimum powder feeder performance. The aim is to maintain a constant differential pressure regardless of variations in down-stream system process pressure which can vary widely. The circuit must be able to resolve and maintain differential pressures to less than 2.5 mbar within process operating range of 0-8 bar.

The system of FIG. 2 utilizes a control or process control 70. The main function of the process control 70 is to regulate process pressure (in hopper pressure mode) and to regulate loss in weight powder flow (gravimetric). The process control 70 communicates with the EP regulator 40 by supplying signals as illustrated with communication CI. Communication CI is two-way with the control 70.

An EP supply regulator 80 is pneumatically connected to the EP regulator 40. A mass flow controller (MFC) 90 is utilized to regulate carrier gas flow and maintain precise carrier gas flow regardless of downstream fluctuations. The EP supply regulator 80 is a gas pressure regulator receiving gas at 10 to 12 bar, and is factory-set to have a 2 bar output. A pilot port on the EP supply regulator 80 communicates process pressure. The regulator output is the sum of the factory-setting and pilot pressure. This device serves to provide 2 bar supply to the Electro-Pneumatic Regulator or EP regulator 40 regardless of process pressure.

As is also shown in FIG. 2, a carrier solenoid is arranged upstream of the EP supply regulator 80. The carrier solenoid is a normally closed 2-way solenoid valve used shut the gas supply off when the powder feeder is not in use. The gas pressure supplied to the carrier solenoid is typically between 10 to 12 bar of an inert gas, typically Nitrogen or Argon gas. This solenoid valve stays open when the powder feeder is electrically energized, supplying gas to other components.

Also shown in FIG. 2, a main air solenoid is arranged upstream of a vibrator pressure regulator. The main air solenoid is a normally-closed 2-way solenoid valve used to shut the air supply off when the powder feeder is not in use. Air pressure supplied to the main air solenoid is typically between 5 to 7 bar. This 2-way valve stays open when the powder feeder is electrically energized, supplying gas to the vibrator pressure regulator.

Figure 3:
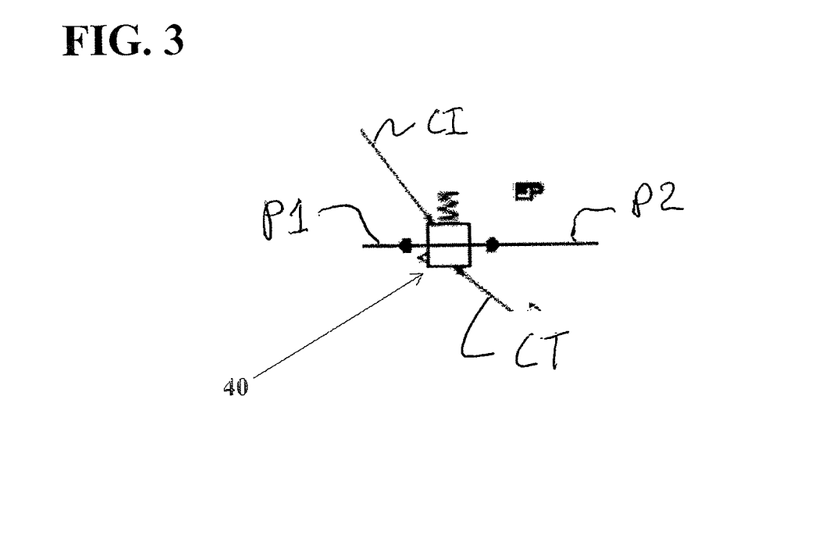
FIG. 3 shows an enlarged portion of the circuit of FIG. 2 and showing the electro pneumatic regular in accordance with the invention.
Figure 4:
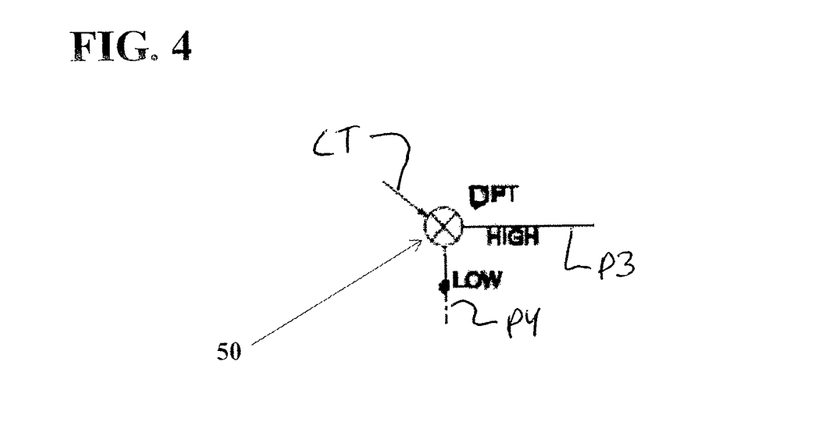
FIG. 4 shows an enlarged portion of the circuit of FIG. 2 and showing the differential pressure transducer in accordance with the invention.

As is shown in FIGS. 2 and 3, the EP regulator 40 utilizes the communication input CI, as well as a pneumatic connection P1 to a carrier pressure regulator and also a pneumatic connection P2 to the hopper 20. The EP regulator 40, in turn, electrically communicates with the DPT 50 via link CT. This communication CT is one-way as shown in FIG. 2.

Referring back to FIG. 2, it should be noted that the pressure regulator upstream of P1 can serve to maintain a constant pressure of 2 bar (about 30 psi) across the EP regulator 40 regardless of spray device back pressure and helps to optimize the EP regulator 40 performance throughout all backpressures. In addition, an MFC supply regulator 95 can serve to maintain constant 2 bar (about 30 psi) across the MFC 90 regardless of spray gun backpressure and helps to optimize the MFC 90 performance throughout all backpressures.

The MFC supply regulator 95 is a gas pressure regulator receiving gas at typically between 10 to 12 bar, and is factory-set to have a 2 bar output. A pilot port on the regulator 95 communicates process pressure. The regulator output is the sum of the factory-setting and pilot pressure. This device serves to provide 2 bar supply to the carrier gas mass flow controller (MFC) 90 regardless of process pressure. The carrier gas mass flow controller (MFC) 90 is an electrically controlled gas flowmeter which serves to convey the powder P from the hopper 20 to the spray device 60. This flow is typically a constant value and the constant value is typically chosen or set to be between 5-15 liters per minute.

FIG. 2 also shows a powder feed solenoid is coupled to the line connecting the carrier solenoid and the EP supply regulator 80 and also to the powder valve. This solenoid is a normally closed 3-way solenoid valve used to open and close the powder valve. A vibrator pressure regulator is coupled to the main air solenoid and is an electrically controlled pressure regulator used to supply air pressure to the air vibrator of the hopper 20. Both the air vibrator and the vibrator pressure regulator are used aid in the flow of difficult to flow powders.

As is shown in FIGS. 2 and 4, the PT 50 utilizes the communication link CT, as well as a first or high pressure pneumatic connection P3 to the hopper 20, which is an input from hopper pressure, and also a second or low pressure pneumatic connection P4 to a downstream part of the carrier conduit 30 which is an input from process pressure. The PT 50, in turn, electrically communicates with the EP regulator 40 via link CT based on changes in the differential pressure between inputs P3 and P4.

In operation, the hopper 20 is filled with powder material and then sealed and pressurized with hopper pressure and during spraying the powder enters the orifice 33 in the manner shown in FIG. 5. During spraying of the powder with the spray device 60, the EP regulator 40 receives command voltage via CI from the control 70. The pressure supplied via P1 to the EP regulator 40 can range from 2 to 10 bar and is always 2 bar above process pressure. EP regulator 40 can be factory set to 2 bar at zero process pressure. The process pressure will range between zero and about 8 bar. However, pressure differences will result between the hopper pressure of line P2 and process pressure of line P4. The PT 50 operates over the range of zero to 1 bar, detects the differential pressure, and communicates with the EP regulator 40 via link CT which changes or adjusts the pressure in line P2. This occurs in real-time and continuously so that a differential pressure is maintained in real-time regardless of process pressure changes and without any input from the control.

An exemplary way in which the EP 40 and PT or DPT 50 work together to regulate differential pressure is as follows. When an operator inputs into the control 70 a desired differential pressure between 0 and 1 bar, e.g., 0.5 bar (in this example), this is communicated to the EP 40 as a voltage signal. The EP 40 then seeks to directly regulate the pressure in line P2 to maintain a desired differential pressure. To do so, however, the EP 40 must be informed of the actual differential pressure as measured by the DPT 50. While the pressure in P2 will be the same as the pressure in P3, the pressure in line P4 can vary during operation of the spray device 60 (the pressure in line P4 is solely governed by the spray device process backpressure). The actual differential pressure as determined by the DPT 50 is calculated by subtracting the pressure in P4 from the pressure in P3. The DPT 50 outputs to the EP 40 a voltage signal that is related to the actual measured differential pressure. If, for example, the pressure at P3 is 0.9 bar and the pressure at P4 is 0.4 bar, then the EP 40 will receive a signal from the DPT 50 indicating a differential pressure of 0.5 bar. As this corresponds to the desired differential pressure input to the control 70, the EP does not cause any change in pressure in line P2. If, however, the pressure at P4 drops to 0.3 bar so that the differential pressure increases to, e.g., 0.6 bar, the DPT 50 will output a signal indicative thereof to the EP 40. The EP 40 will then change the pressure in P2 in order to maintain the desired differential pressure at 0.5 bar. It will do this by regulating (partial closing) an internal valve that lowers the differential pressure in P2 to 0.8 bar which maintains the differential pressure at 0.5 bar (0.8 bar–0.3 bar=0.5 bar). If, on the other hand, the pressure at P4 increases to 0.5 bar so that the differential pressure decreases to, e.g., 0.4 bar, the DPT 50 will output a signal indicative thereof to the EP 40. The EP 40 will then change the pressure in P2 in order to maintain the desired differential pressure at 0.5 bar. It will do this by regulating (partial opening) an internal valve that increases the pressure in line P2 to 1 bar which maintains the differential pressure at 0.5 bar (1 bar–0.5 bar=0.5 bar).

Figure 5:
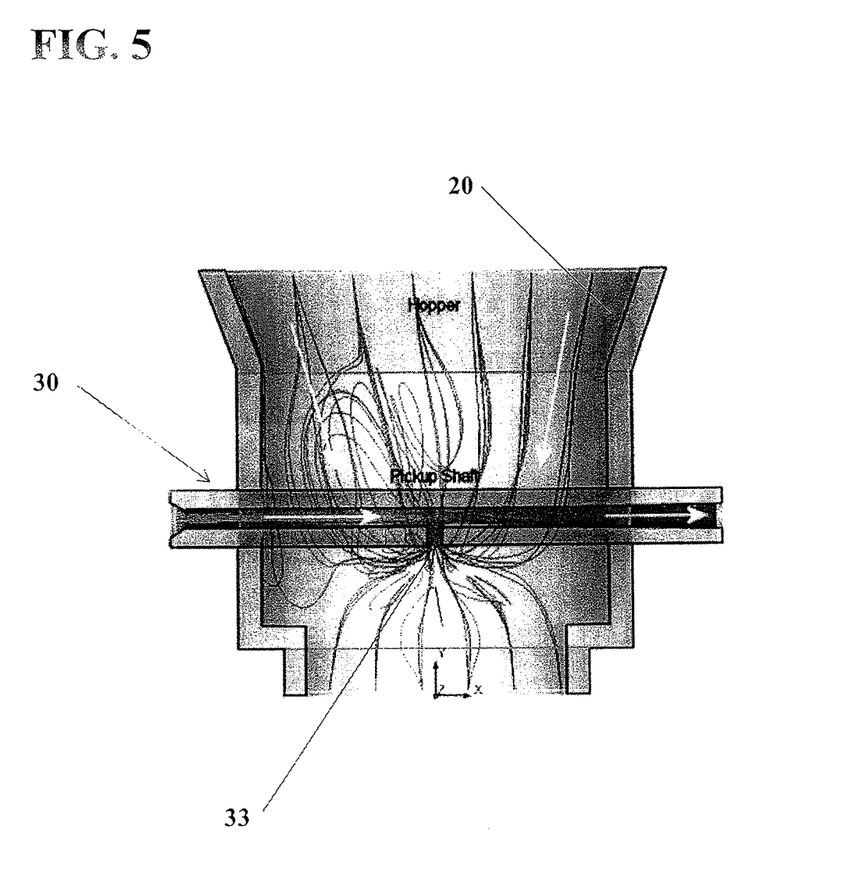
FIG. 5 shows schematically shows gas flows inside a hopper.

The hopper 20 is similar or the same as that in the prior art. Typically, the hopper is sealed and pressurized with a gas. The only exit for the gas is through the carrier conduit or pickup shaft via the intake orifice 33 (see FIG. 5). The gas flow converges on the orifice 33 and the velocity increases. In this way, the powder particles inside the hopper 20 become suspended and are conveyed into the pickup shaft or carrier conduit 30.

Non-limiting examples of the differential pressure transducer PT 50 include Freescale Semiconductor, Inc. Model MPX5100DP whose product information is available on the Internet as http://www.nxp.com/assets/documents/data/en/data-sheets/MPX5100.pdf. The entire disclosure of this Hyperlink document/webpage is hereby expressly incorporated by reference in its entirety.

A differential pressure transducer is conventionally used to measure a differential pressure between two pressure sources. This differential pressure is normally defined as the pressure at one source subtracted from the pressure at another source. The pressure at each source may also be referred to as line pressure. Some conventional differential pressure transducers contain a sensing element that is located between two separate pistons, each of which acts as a force collector. Each of the pistons is independently displaced in response to a pressure at one of the two volumes to which the transducer is exposed. The sensing element provides an electrical output indicative of the combined displacement of the two pistons by translating the displacement difference to an electrical signal. This electrical output is thus indicative of the differential pressure between the two volumes. Since it is necessary to locate the actual sensing element between the two opposing pistons, construction of these transducers is complex, and the resulting transducers are expensive.

A pressure transducer typically has an operating range over which the transducer will provide an electrical output indicative of the differential pressure. When the differential pressure approaches the limits of the operating range, any further increase in differential pressure beyond the operating range limits will not produce any further change in the electrical output of the transducer. Therefore, mechanical protection is conventionally provided to prevent damage to the sensing elements and other elements within the transducer as a result of, for example, excess movement of the elements in response to a high differential pressure. This protection, which is called overload protection, is provided for each of the two force collectors and it is typically complex and costly.

A differential pressure transducer should preferably provide zero output when the differential pressure is zero. This condition is referred to as maintaining line balance. Conventionally, line balance is achieved using precision parts and making adjustments to the transducer, which is expensive and time consuming.

Non-limiting examples of the electro pneumatic regulator EP 40 include Proportional-Air Model PA1001S1 or equivalent—information of which is available from the manufacturer. The entire disclosure of the available product information is hereby expressly incorporated by reference in its entirety. The electro-pneumatic regulator EP 40 can have a supply of gas up to 10 bar, and can output pressure of 0-1 bar via voltage command from the powder feeder control computer or control 70. The command voltage is determined by computer but the EP 40 closes the pressure loop based on the externally mounted differential pressure transducer PT 50. Therefore the EP 40 pressure output can be adaptive to any fluctuations in process back-pressure. In essence the EP 40 pressure output is relative to process back-pressure not atmospheric pressure. This is superior to the current practice of using a computing relay regulator CRR which adds the pressure from the traditional EP regulator to the process pressure via sense line and also add a preset zero-bias to perform the same function.

Further, at least because the invention is disclosed herein in a manner that enables one to make and use it, by virtue of the disclosure of particular exemplary embodiments, such as for simplicity or efficiency, for example, the invention can be practiced in the absence of any additional element or additional structure that is not specifically disclosed herein.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

Powder feed rate control system 10
Hopper 20
Hopper pressure line 21
Carrier conduit 30
Process pressure side 31
Carrier gas flow side 32
Intake orifice 33
Electro Pneumatic regulator (EP) 40
Input from pressure regulator P1
Input from hopper pressure P2
Communication link CT
Differential pressure transducer (PT) 50
Input from hopper pressure P3
Input from process pressure P4
Spray device 60
Control 70
EP supply regulator 80
Mass flow control (MFC) 90
MFC supply regulator 95
Powder P

What is claimed:

1. A powder feed rate control system comprising:
a hopper adapted to contain a powder and to maintain a hopper pressure;
a carrier conduit delivering a carrier gas flow and having an orifice, said carrier gas flow conveying powder entering through the orifice at a powder feed rate;
a differential pressure transducer comprising:
a first pressure input indicative of the hopper pressure; and
a second pressure input indicative of the carrier gas flow downstream of the hopper;
said differential pressure transducer (PT) outputting a signal related to a differential pressure between the first pressure input and the second pressure input; and
an electro-pneumatic regulator (EP) directly coupled to the differential pressure transducer (PT) and receiving the signal related to the differential pressure and adapted to communicate with a control,
wherein the system is configured to maintain the differential pressure in real-time regardless of process pressure changes and without any input from the control.

2. The system of claim 1, wherein the control sets or regulates the carrier gas flow.

3. The system of claim 1, wherein the first pressure input is a high or higher pressure input and the second pressure input is a low or lower pressure input.

4. The system of claim 1, wherein the differential pressure is between 0 and 1 bar.

5. The system of claim 1, wherein the electro-pneumatic regulator (EP) receives a supply pressure of between 2 bar and 10 bar.

6. The system of claim 1, further comprising a spray device coupled to the carrier conduit and operating at a process pressure.

7. The system of claim 6, wherein the process pressure is between 0 bar and 8 bar.

8. The system of claim 6, wherein the spray device is coupled to the carrier conduit via a powder feed hose.

9. The system of claim 1, wherein the signal comprises signal voltage.

10. The system of claim 1, wherein the electro pneumatic regulator (EP) receives command signals from the control.

11. The system of claim 1, wherein the control receives signals from the electro pneumatic regulator (EP).

12. The system of claim 11, wherein the differential pressure is between 0 and 1 bar.

13. A powder feed rate control system comprising:
a control;
a hopper adapted to contain a powder and to maintain a hopper pressure;
a carrier conduit delivering a carrier gas flow and having an orifice, said carrier gas flow conveying powder entering through the orifice at a powder feed rate;
a differential pressure transducer comprising:
a first pressure input coupled to a hopper pressure line; and
a second pressure input coupled to a process pressure line;
said differential pressure transducer outputting a signal related to a differential pressure between a hopper pressure and a process pressure; and
an electro pneumatic regulator directly coupled to the differential pressure transducer and receiving command voltage signals from the control and receiving the signal related to the differential pressure,
wherein the differential pressure is proportional to the powder feed rate and is maintained at a pressure of between 0 and 1 bar, and
wherein at least one of:
the electro pneumatic regulator (EP) receives command signals from the control; or
the system is configured to maintain the differential pressure in real-time regardless of process pressure changes and without any input from the control.

14. A powder feed rate control system comprising:
a hopper adapted to contain a powder and to maintain a hopper pressure;
a carrier conduit delivering a carrier gas flow and having an orifice, said carrier gas flow conveying powder entering through the orifice at a powder feed rate;
a differential pressure transducer comprising:
a first pressure input indicative of the hopper pressure; and
a second pressure input indicative of the carrier gas flow downstream of the hopper;
said differential pressure transducer (PT) outputting a signal related to a differential pressure between the first pressure input and the second pressure input;
an electro-pneumatic regulator (EP) coupled to the differential pressure transducer (PT) receiving command signals from the control, and receiving the signal related to the differential pressure; and a control communicating directly with the electro-pneumatic regulator (EP),
wherein the differential pressure transducer (PT) communicates directly with the electro-pneumatic regulator (EP), and
wherein the system is configured to maintain the differential pressure in real-time regardless of process pressure changes and without any input from the control.

\* \* \* \* \*